(12) United States Patent
Shin et al.

(10) Patent No.: US 8,284,928 B2
(45) Date of Patent: Oct. 9, 2012

(54) GUIDE DEVICE FOR SLIDING UNIT IN MOBILE TERMINAL

(75) Inventors: Hyun-Suk Shin, Guni-si (KR);
Jeong-Hun Seo, Suwon-si (KR);
Sung-Gwan Woo, Yangsan-si (KR);
Young-Su Shim, Ulsan (KR)

(73) Assignees: Samsung Electronics Co., Ltd.,
Suwon-si (KR); KHVATEC Co., Ltd.,
Gumi-si (KR)

( * ) Notice: Subject to any disclaimer, the term of this patent is extended or adjusted under 35 U.S.C. 154(b) by 90 days.

(21) Appl. No.: 13/005,734

(22) Filed: Jan. 13, 2011

(65) Prior Publication Data

US 2011/0176756 A1 Jul. 21, 2011

(30) Foreign Application Priority Data

Jan. 21, 2010 (KR) .................. 10-2010-0005778

(51) Int. Cl.
*H04M 1/00* (2006.01)
*H04M 9/00* (2006.01)

(52) U.S. Cl. .............................. 379/433.12; 455/575.4
(58) Field of Classification Search ............ 379/433.11, 379/433.12; 455/575.1, 575.4, 90.3, 550.1
See application file for complete search history.

(56) References Cited

U.S. PATENT DOCUMENTS

| 7,003,104 B2 * | 2/2006 | Lee ........................ 379/433.13 |
| 7,184,806 B2 * | 2/2007 | Bae ........................... 455/575.4 |
| 2009/0247248 A1 * | 10/2009 | Ito ............................. 455/575.4 |

\* cited by examiner

*Primary Examiner* — Tuan Nguyen
(74) *Attorney, Agent, or Firm* — Jefferson IP Law, LLP

(57) ABSTRACT

A guide device for a sliding unit in a mobile terminal is provided. The guide device includes a lower slide including latch portions formed to open outwards, guide rails manufactured independently to be assembled with the latch portions, wherein the guide rails are disposed to extend in a longitudinal direction of the lower slide, and a guide plate comprising rack portions coupled with the guide rails, wherein the guide plate is disposed to face the lower slide.

18 Claims, 6 Drawing Sheets

GUIDE DEVICE FOR SLIDING UNIT IN MOBILE TERMINAL

PRIORITY

This application claims the benefit under 35 U.S.C. §119 (a) of a Korean patent application filed in the Korean Intellectual Property Office on Jan. 21, 2010 and assigned Serial No. 10-2010-0005778, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are SAMSUNG ELECTRONICS CO., LTD and KHVATEC CO., LTD.

BACKGROUND OF THE INVENTION

1. Field of the Invention

The present invention relates to a sliding-type mobile terminal. More particularly, the present invention relates to a guide device for a sliding unit in a sliding-type mobile terminal.

2. Description of the Related Art

Mobile terminals include a notebook, a Personal Digital Assistant (PDA), a radiotelegraph, an MP3player, a Portable Multimedia Player (PMP), a cellular phone, a smart phone, and the like. Among them, a light and compact cellular phone or a smart phone having a communication function is easy to carry and has evolved into a mobile terminal which allows convenient viewing in numerous modes to meet the demand for video communication, games, on-demand video, and TeleVision (TV) viewing as well as simple voice communication and short text message transmission with the emergence of multimedia environments.

The mobile terminals can be classified into a bar type, a folder type, and a sliding type according to their appearance. The sliding-type mobile terminal includes a main body, a sliding body which slides on the main body, and a sliding unit which couples the main body with the sliding body.

FIG. 1 is a perspective view of a closed state of a sliding-type mobile terminal according to the related art and FIG. 2 is a perspective view of an open state of a sliding-type mobile terminal according to the related art.

Referring to FIGS. 1 and 2, a sliding-type mobile terminal 200 includes a main body 20 and a sliding body 22, which slides on the main body 20 to open or close a top surface of the main body 20. On an opening/closing region of the top surface of the main body 20 are disposed a key pad 201 having a plurality of keys and a microphone device 202. On a top surface of the sliding body 22 are provided a display unit 221, another keypad 222, and a speaker device 223. Between the top surface of the main body 20 and a bottom surface of the sliding body 22 is mounted a sliding unit for semi-automatically opening or closing the sliding body 22 in a linear manner.

FIG. 3 is a perspective view of a guide device for a sliding unit according to the related art and FIG. 4 is a cross-sectional view of a guide device for a sliding unit according to the related art.

Referring to FIGS. 3 and 4, a sliding unit employed in a sliding-type mobile terminal 200 provides a guide device 30 for allowing the sliding body 22 to move linearly on the main body 20. The guide device 30 includes a sliding body bottom surface 31 and a guide plate 32 assembled to face the bottom surface 31. A latch member 310 extends along a longitudinal direction of the sliding body 22 at both ends of the sliding body bottom surface 31, and a rack member 320 is provided at both ends of the guide plate 32 to be assembled to the latch member 310. The rack member 320, which is in a bent hook shape, has an injection portion 321 formed of PolyOxyMethylene (POM) to surround outer and inner surfaces and an end portion of the rack member 320. The injection portion 321 may be formed by insert-injection in the rack member 320. The injection portion 321 made of POM has been provided to improve sliding sensitivity during opening or closing of the sliding body 22.

However, since the latch member 320 and the injection portion 321 made of POM are formed by insert-injection in the typical guide device 30, some part may have severe friction and in particular, a sliding operation may not be uniform and smooth according to injection conditions and painting conditions. Such a state may shorten the lifespan of the sliding unit.

Therefore, a need exists for a guide device for a sliding unit in which a sliding operation of a sliding body is smooth and a lifespan of which is lengthened by minimizing generation of a scratch during opening or closing of a sliding-type mobile terminal.

SUMMARY OF THE INVENTION

An aspect of the present invention is to address at least the above-mentioned problems and/or disadvantages and to provide at least the advantages described below. Accordingly, an aspect of the present invention is to provide a guide device for a sliding unit in which a sliding operation of a sliding body is smooth.

Another aspect of the present invention is to provide a guide device for a sliding unit, a lifespan of which is lengthened by minimizing generation of a scratch during opening or closing of a sliding-type mobile terminal.

Still another aspect of the present invention is to provide a guide device for a sliding unit which is improved in terms of flexibility in designing and structural stiffness by using a guide rail made of PolyOxyMethylene (POM) having excellent mechanical processibility.

According to an aspect of the present invention, a guide device for a sliding unit in a mobile terminal is provided. The guide device includes a lower slide comprising latch portions formed to open outwards, guide rails manufactured independently to be assembled with the latch portions, wherein the guide rails are disposed to extend in a longitudinal direction of the lower slide, and a guide plate comprising rack portions coupled with the guide rails, wherein the guide plate is disposed to face the lower slide.

According to another aspect of the present invention, a guide device for a sliding unit in a mobile terminal is provided. The guide device includes a lower slide, formed of a first material, comprising latch portions, guide rails, formed of a second material different from the first material, to be assembled with the latch portions, the guide rails being disposed to extend in a longitudinal direction of the lower slide, and a guide plate comprising rack portions coupled with the guide rails, the guide plate being disposed to face the lower slide.

According to yet another aspect of the present invention, a method of forming a guide device for a sliding unit in a mobile terminal is provided. The method includes forming a lower slide of a first material, the lower slide comprising latch portions, forming guide rails independently of the lower slide and of a second material different from the first material, the guide rails to be assembled with the latch portions in a longitudinal direction of the lower slide, and forming a guide plate comprising rack portions for coupling with the guide rails, the guide plate formed for disposal facing the lower slide.

The guide rails may be made of a polymer material.

The polymer material may include a POM material.

A cross section of each of the guide rails may be in a '⊏' shape.

Each of the guide rails may include a vertical portion, an upper extending portion extending from an end of the vertical portion in a horizontal direction, a lower extending portion extending from the other end of the vertical portion in the horizontal direction to face the upper extending portion, and a recessed portion formed between the vertical portion and the upper and lower extending portions, the recessed portion being disposed on the latch portion to open outwards.

An inner surface of the latch portion may be fixed to surface-contact an outer surface of the guide rail, and top and bottom surfaces of the recessed portion may be provided with buffering portions in regions contacted by an end portion of the rack portion.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

Detailed Description of Exemplary Embodiments

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
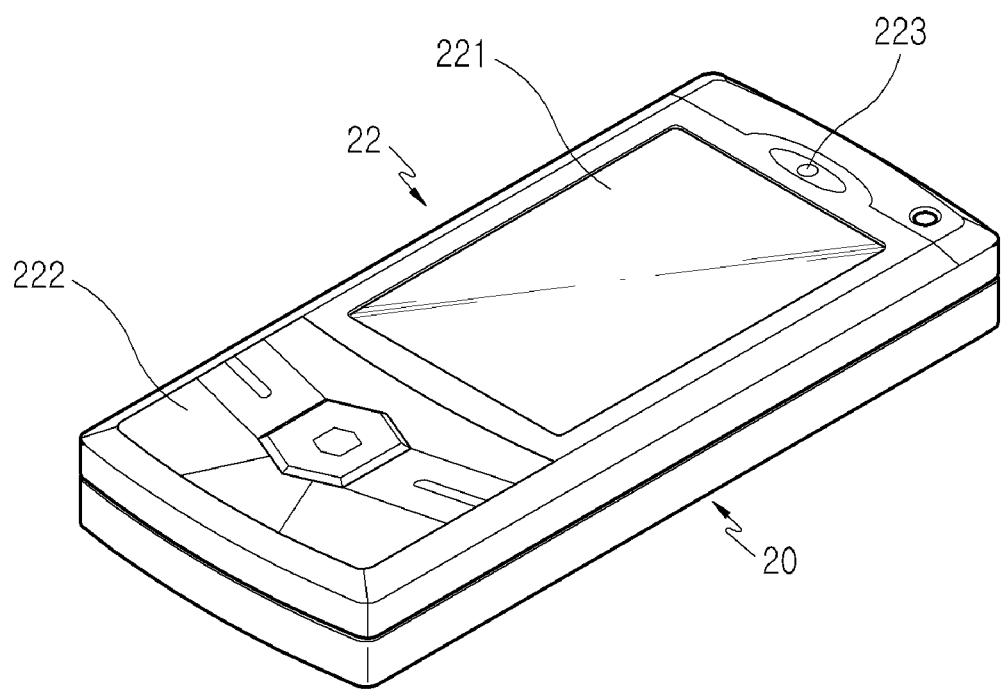
FIG. 1 is a perspective view of a closed state of a sliding-type mobile terminal according to the related art.
Figure 2:
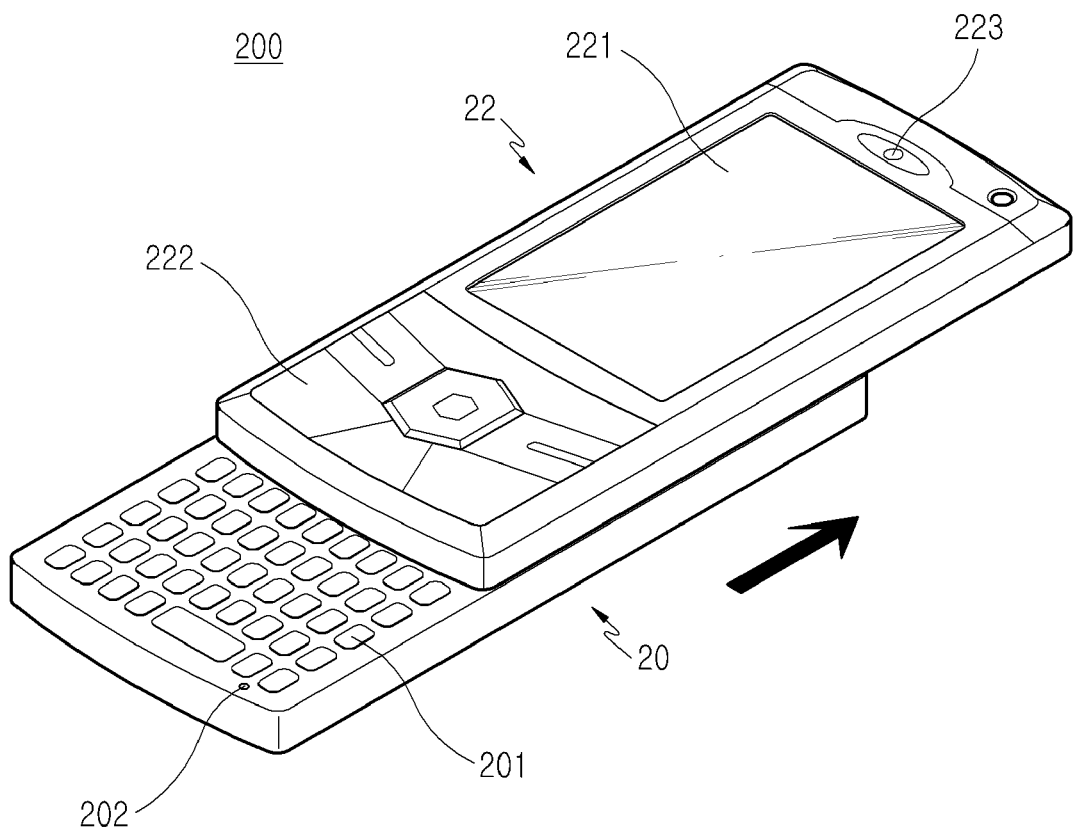
FIG. 2 is a perspective view of an open state of a sliding-type mobile terminal according to the related art.
Figure 3:
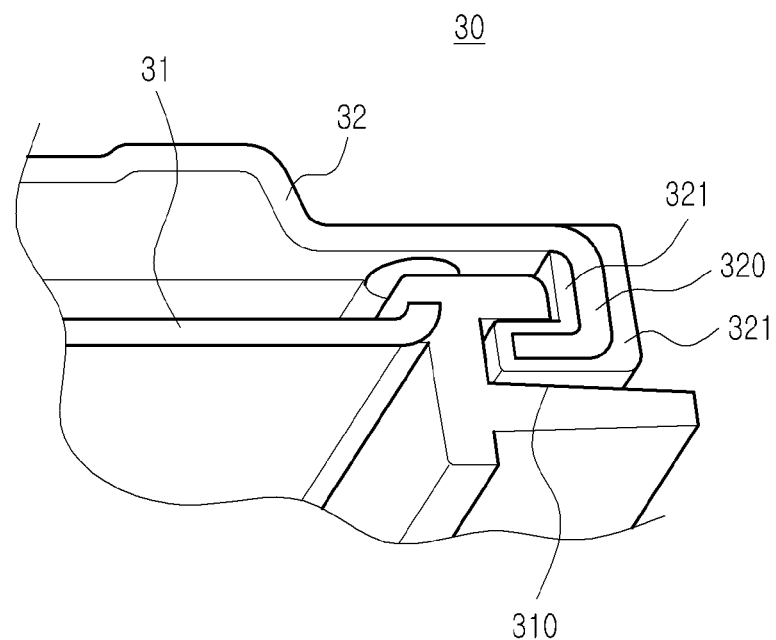
FIG. 3 is a perspective view of a guide device for a sliding unit according to the related art.
Figure 4:
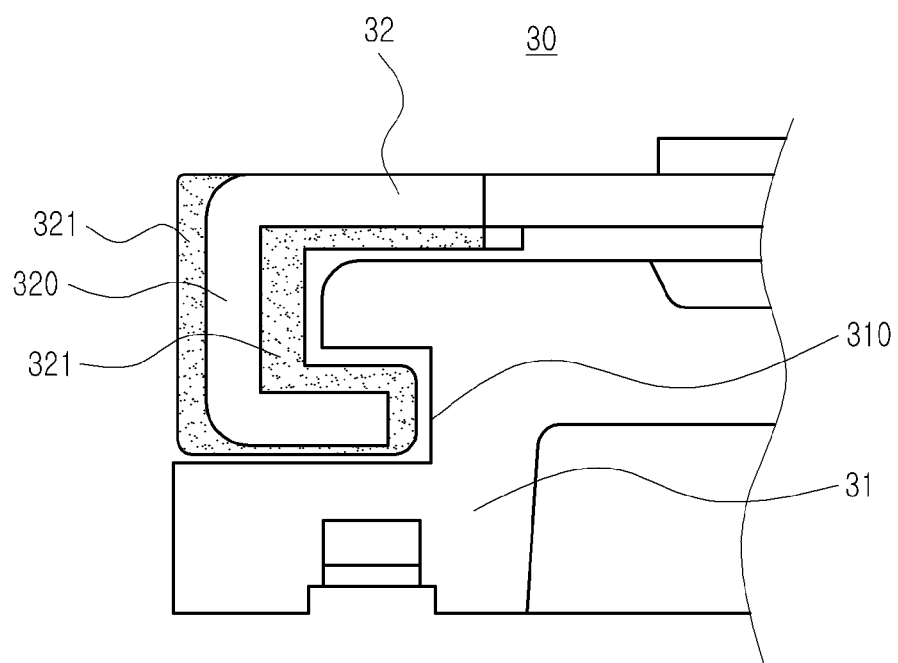
FIG. 4 is a cross-sectional view of a guide device for a sliding unit according to the related art.
Figure 5:
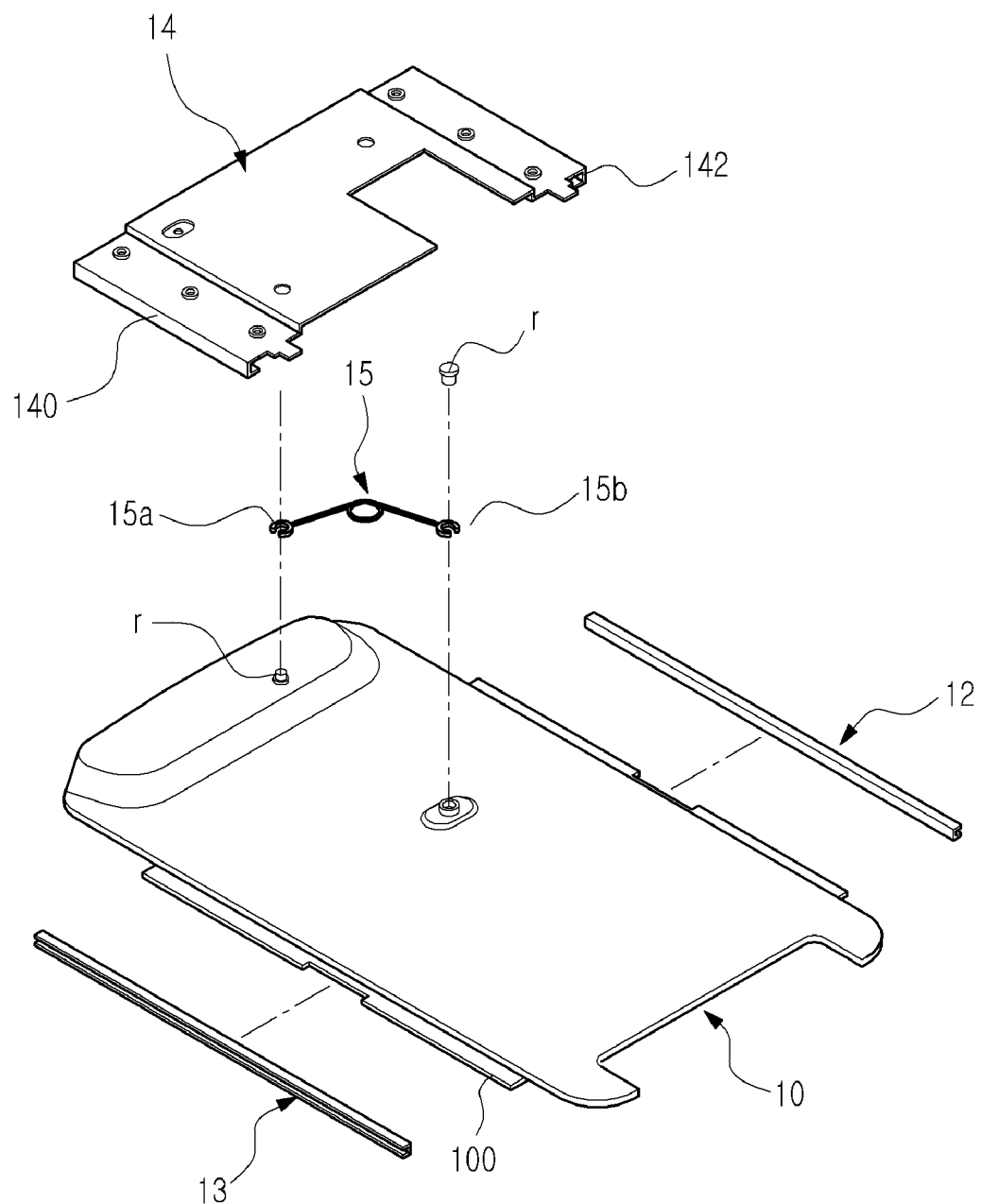
FIG. 5 is an exploded perspective view of a sliding unit adopting a guide device according to an exemplary embodiment of the present invention.
Figure 6:
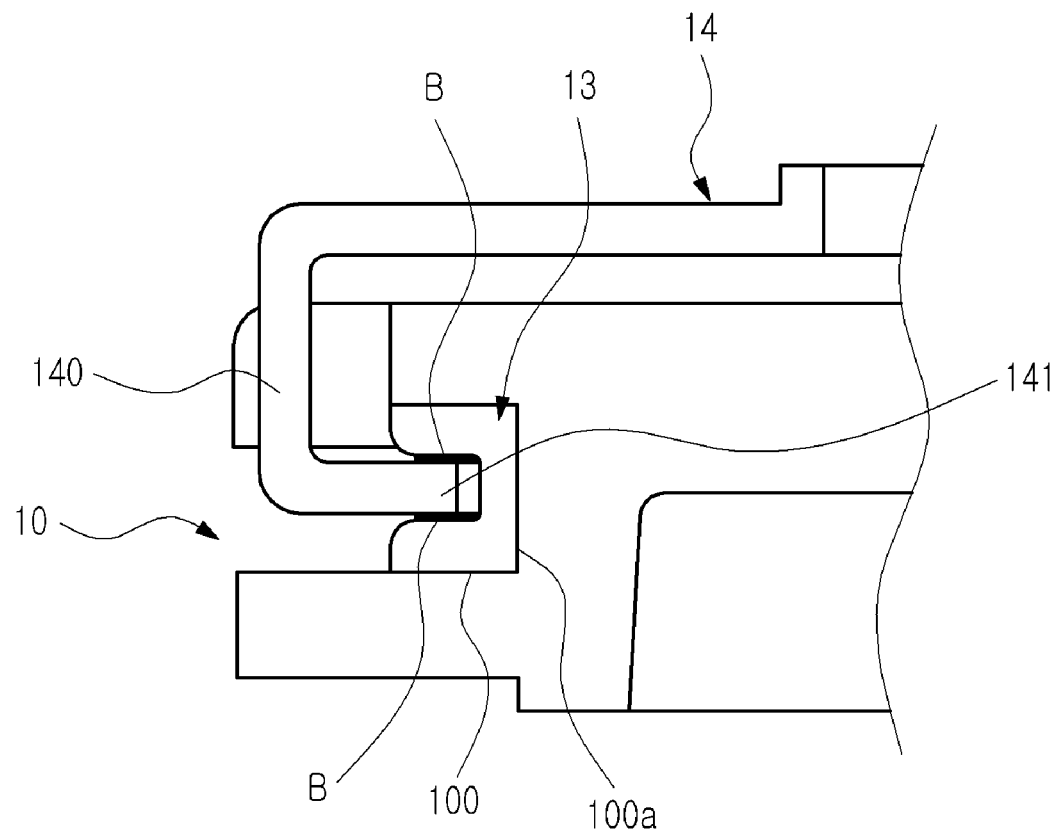
FIG. 6 is a cross-sectional view of a guide device according to an exemplary embodiment of the present invention.
Figure 7:
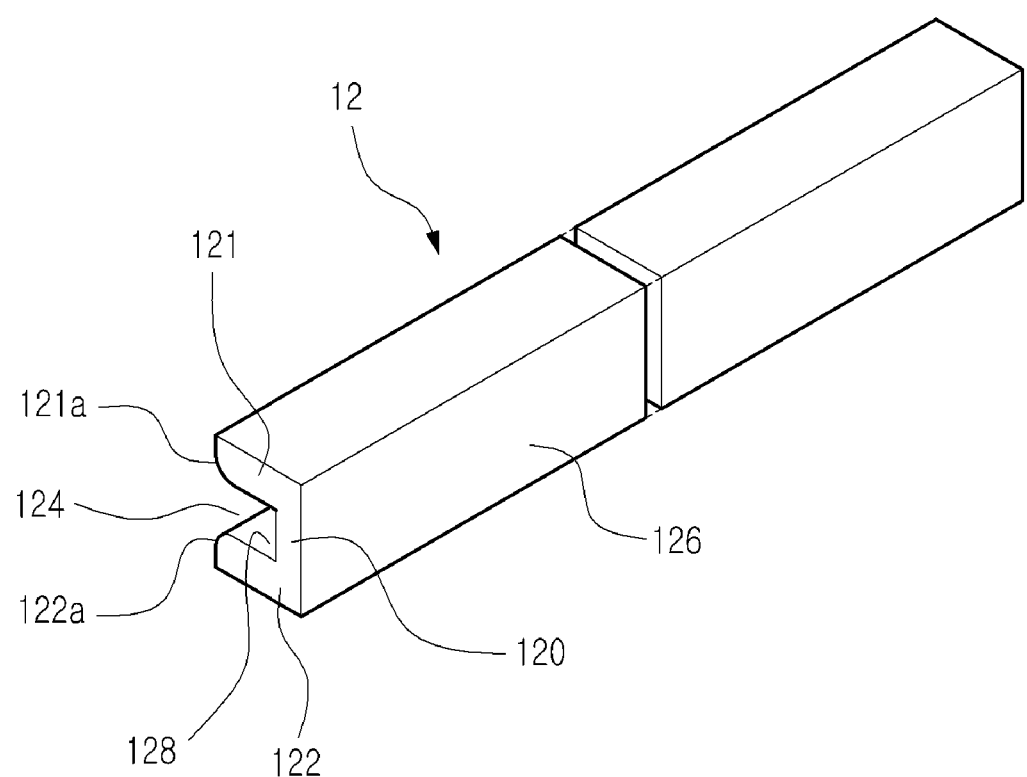
FIG. 7 is a perspective view of a guide rail according to an exemplary embodiment of the present invention.

FIGS. 5 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 5 is an exploded perspective view of a sliding unit adopting a guide device according to an exemplary embodiment of the present invention.

Referring to FIG. 5, a sliding-type mobile terminal includes a main body and a sliding body, which may be opened from or closed to the main body by a sliding unit. The sliding unit used for the sliding-type mobile terminal includes a guide device and an actuating portion 15 coupled with the guide device to provide a semi-automatic actuating force to the guide device. The guide device according to an exemplary embodiment of the present invention includes a lower slide 10, guide rails 12 and 13, and a guide plate 14. The actuating portion 15 includes an actuator, an end 15a of which may be fixed to the guide plate 14 and the other end 15b of which may be fixed to the lower slide 10 to provide a semi-automatic sliding force. Both ends of the actuator are fixed to the guide plate 14 and the lower slide 10, respectively, by engagement members. In an exemplary implementation, the engagement members are rivets (r). The actuating portion 15 also includes an elastic body. The guide plate 14 may also include rack portions 140 and 142.

The lower slide 10, which serves as a sliding body bottom surface (not shown), has latch portions 100 at both side ends thereof. The latch portions 100 are spaces for allowing a pair of guide rails 12 and 13 to be mounted safely and are formed to open outwards. The guide rails 12 and 13 are manufactured to extend in a longitudinal direction of the lower slide 10, such that they are mounted on the latch portions 100 to extend in the longitudinal direction of the lower slide 10.

FIG. 6 is a cross-sectional view of a guide device according to an exemplary embodiment of the present invention. FIG. 7 is a perspective view of a guide rail according to an exemplary embodiment of the present invention.

Referring to FIGS. 6 and 7, guide rails 12 and 13 are manufactured independently and are disposed symmetrically with respect to each other by being assembled to the respective latch portions 100. The two guide rails 12 and 13 have the same structure as each other, and thus a structure of the guide rail 12 as their representative will be described.

Referring to FIG. 7, the guide rail 12 manufactured independently may be made of a polymer material, and more specifically a PolyOxyMethylene (POM) material. The POM material, a synthetic resin, is easy to manufacture due to its superior mechanical processibility, and has excellent lubricity and resistance against friction. The guide rail 12 has a '⊏'-shape cross section. The guide rail 12 includes a vertical portion 120 extending in a vertical direction, an upper extending portion 121 extending from an end of the vertical portion 120 in a horizontal direction, and a lower extending portion 122 extending from the other end of the vertical portion 120 in the horizontal direction to face the upper extending portion 121. Between the vertical portion 120 and the upper and lower extending portions 121 and 122 may be formed a recessed portion 124 which extends in a longitudinal direction. More particularly, the recessed portion 124 is disposed to open outwards, such that it is coupled with a rack portion 140.

The vertical portion 120 may be perpendicular to the upper and lower extending portions 121 and 122, such that an outer surface 126 thereof is disposed to surface-contact an inner surface 100a of the latch portion 100 and an inner surface 128 thereof slides in contact with an end portion 141 of the rack portion 140. An inner corner 121a of the upper extending portion 121 of the guide rail 12 is in a curved shape, and an inner corner 122a of the lower extending portion 122 is also in a curved shape, thereby facilitating coupling with the rack portion 140 and contributing to a smooth sliding operation.

Referring back to FIG. 6, the guide device may further include a buffering portion B in regions contacted by the end portion 141 of the rack portion 140 while inserted on top and bottom surfaces of the recessed portion. The buffering portion B is provided to surface-contact the end portion 141 of the rack portion 140, thus allowing a smooth sliding operation.

As it is apparent from the foregoing description, the sliding unit may reduce generation of a scratch by minimizing friction between the end portion of the rack portion and the guide rail, thereby improving the performance of sliding-opening/closing. Moreover, exemplary embodiments of the present invention contribute to lengthening the lifespan of a product by minimizing generation of a scratch in the sliding unit. Furthermore, the guide rail of the guide device according to exemplary embodiments of the present invention, owing to its excellent mechanical processibility, enhances flexibility in designing and is easy to structurally reinforce by partial change, thus having a structure favorable to structural stiffness reinforcement.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A guide device for a sliding unit in a mobile terminal, the guide device comprising:
 a lower slide comprising latch portions formed to open outwards;
 guide rails manufactured independently to be assembled with the latch portions, the guide rails being disposed to extend in a longitudinal direction of the lower slide; and
 a guide plate comprising rack portions coupled with the guide rails, the guide plate being disposed to face the lower slide.

2. The guide device of claim 1, wherein the guide rails comprise a polymer material.

3. The guide device of claim 2, wherein the polymer material comprises a PolyOxyMethylene (POM) material.

4. The guide device of claim 1, wherein a cross section of each of the guide rails comprises a '⊏' shape.

5. The guide device of claim 4, wherein each of the guide rails comprises:
 a vertical portion;
 an upper extending portion extending from an end of the vertical portion in a horizontal direction;
 a lower extending portion extending from the other end of the vertical portion in the horizontal direction to face the upper extending portion; and
 a recessed portion formed between the vertical portion and the upper and lower extending portions, the recessed portion being disposed on the latch portion to open outwards.

6. The guide device of claim 5, wherein an inner surface of the latch portion is fixed to surface-contact an outer surface of the guide rail, and top and bottom surfaces of the recessed portion are provided with buffering portions in regions contacted by an end portion of the rack portion.

7. The guide device of claim 1, wherein the sliding unit comprises an actuating portion coupled with the guide device to provide a semi-automatic actuating force to the guide device.

8. The guide device of claim 7, wherein the actuating portion comprises an actuator, wherein its one end may be fixed to the guide plate and its other end may be fixed to the lower slide to provide a semi-automatic sliding force.

9. A guide device for a sliding unit in a mobile terminal, the guide device comprising:
 a lower slide, formed of a first material, comprising latch portions;
 guide rails, formed of a second material different from the first material, to be assembled with the latch portions, the guide rails being disposed to extend in a longitudinal direction of the lower slide; and
 a guide plate comprising rack portions coupled with the guide rails, the guide plate being disposed to face the lower slide.

10. The guide device of claim 9, wherein the guide rails comprise a polymer material.

11. The guide device of claim 10, wherein the polymer material comprises a PolyOxyMethylene (POM) material.

12. The guide device of claim 9, wherein a cross section of each of the guide rails comprises a '⊏' shape.

13. The guide device of claim 12, wherein each of the guide rails comprises:
 a vertical portion;
 an upper extending portion extending from an end of the vertical portion in a horizontal direction;
 a lower extending portion extending from the other end of the vertical portion in the horizontal direction to face the upper extending portion; and a recessed portion formed between the vertical portion and the upper and lower extending portions, the recessed portion being disposed on the latch portion to open outwards.

14. The guide device of claim 13, wherein an inner surface of the latch portion is fixed to surface-contact an outer surface of the guide rail, and top and bottom surfaces of the recessed portion are provided with buffering portions in regions contacted by an end portion of the rack portion.

15. The guide device of claim 9, wherein the sliding unit comprises an actuating portion coupled with the guide device to provide a semi-automatic actuating force to the guide device.

16. The guide device of claim 15, wherein the actuating portion comprises an actuator, wherein its one end may be fixed to the guide plate and its other end may be fixed to the lower slide to provide a semi-automatic sliding force.

17. A method of forming a guide device for a sliding unit in a mobile terminal, the method comprising:
    forming a lower slide of a first material, the lower slide comprising latch portions;
    forming guide rails independently of the lower slide and of a second material different from the first material, the guide rails to be assembled with the latch portions in a longitudinal direction of the lower slide; and
    forming a guide plate comprising rack portions for coupling with the guide rails, the guide plate formed for disposal facing the lower slide.

18. The method of claim 17, wherein the second material comprises a polymer material,
    wherein the polymer material is a PolyOxyMethylene (POM) material.

* * * * *